Sept. 11, 1962 B. HOLM 3,054,086
SECTOR LIGHT
Filed April 6, 1959

INVENTOR
BENGT HOLM,

BY Larson and Taylor
ATTORNEYS

United States Patent Office 3,054,086
Patented Sept. 11, 1962

3,054,086
SECTOR LIGHT
Bengt Holm, Malmö, Sweden, assignor to Svenska Aktiebolaget Gasaccumulator, Lidingo, near Stockholm, Sweden, a corporation of Sweden
Filed Apr. 6, 1959, Ser. No. 804,473
Claims priority, application Sweden Apr. 28, 1958
3 Claims. (Cl. 340—25)

In a beacon having for its purpose to mark a waterway, it is of essential importance that a small lateral deviation from the waterway result in the clearly recognizable change in the beacon signal character, and, also, that the light strength have a high value. Furthermore, an important requirement is that it should not be possible for an erroneous signal character to be present in the vicinity of the waterway marked by the beacon, as may be the case, for instance owing to the diffuse light emitted through frost or snow coated glass panes of the beacon.

The present invention, which relates to a sector light, preferably for narrow waterways, meets all of the above requirements with regard to directional precision, light strength and positive suppression of undesired light. Furthermore, it is possible according to the invention to provide for the various light sectors not only different colours by alternatively or simultaneously also different signal characters.

For each beacon light sector there is provided an individual light source or light emitting unit, preferably of a directional character corresponding to the angular extent of the sectors. Through a mutual positioning and screening of the light emitting units with the aid of an inner screen as well as an outer screen, which is placed a somewhat larger distance from the light sources, positive separation of the light sectors is achieved. The object of the inner screen is chiefly to prevent direct light from the various light sources as well as diffuse light from their corresponding glass panes to be seen in undesired directions. The outer screen limits the lateral distribution of the light for the ranging beam on the one hand by means of a central light aperture and for the lateral sectors on the other hand by means of its lateral borders or, alternatively, by means of additional light apertures, the arrangement being such that the boundary line of a lateral sector which is closest to the ranging beam sector will be codirectional with the ranging beam boundary. Preferably, the distance between adjacent light apertures is substantially equal to the distance in the same plane between those parts of adjacent light emitting units which are at the greatest distance from each other. Furthermore, it may be preferable in order to suppress erroneous light effects to place the light emitting units of the lateral sectors in a different horizontal plane from that of the light emitting unit for the ranging beam and its corresponding light aperture.

Figure 1:
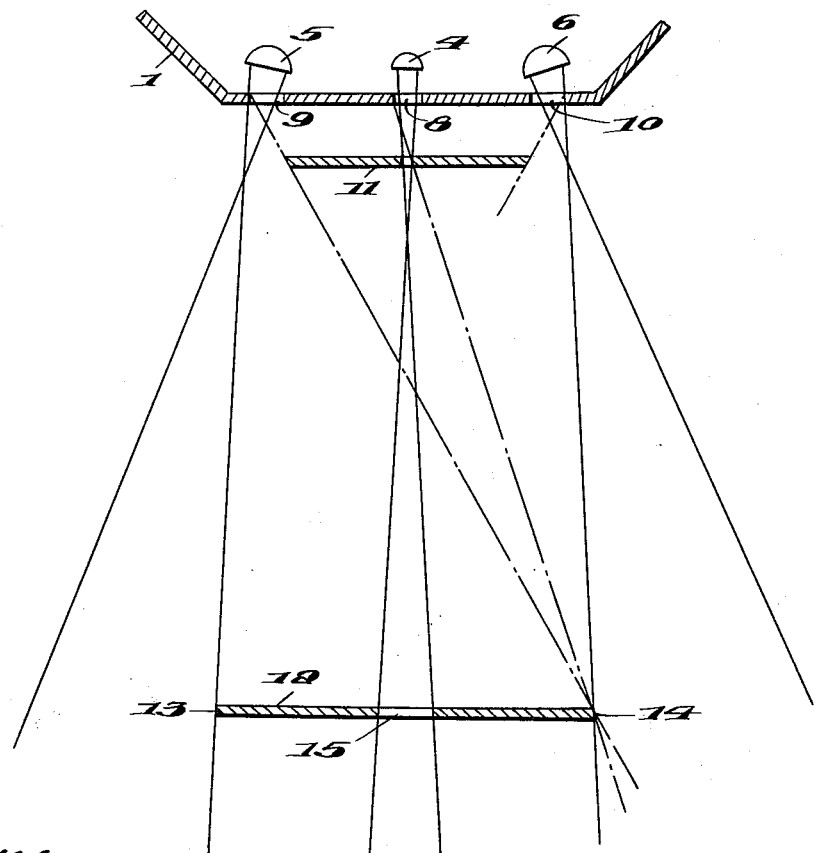
Figure 2:
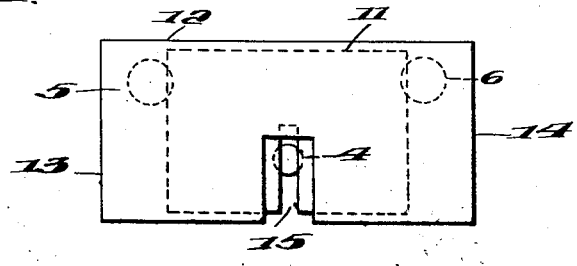

A suitable embodiment of the invention is shown on the attached drawing in FIG. 1 in plan view and in FIG. 2 in lateral elevation.

The light beacon shown in the drawing is adapted to produce three sectors 1, 2 and 3, the central sector 1 having a relatively small angular dimension and serving as a ranging beam. The light for the ranging beam is produced by a light source 4, which is provided with an optical system, for instance in the form of a reflector, and/or a lense, whereby the light is concentrated to the ranging beam and produces a high value of light intensity within the beam. For the lateral sectors, separate light sources 5 and 6 are provided, which are also fitted with optical systems, whereby the light from these light sources is concentrated in a corresponding manner to the respective lateral sectors. The light sources may be disposed within a common casing 7, which may be provided with separate apertures 8, 9 and 10 for each sector. The apertures 9 and 10 may also be covered by coloured glasses, whereby a different signal character is obtained for the lateral sectors.

An inner screen 11 is ranged in such a way as to prevent light from the lamp 4 or the window 8 from being visible outside the two lateral borders 13 and 14 of an outer screen 12 and, in a similar manner, it prevents light from the lamps 5 and 6 or their windows 9 and 10 to be visible outside the screen borders 14 and 13, respectively. In the embodiment shown, the lamps 5 and 6 are furthermore placed in a higher position than the upper border of the central light aperture 15 for the ranging beam, whereby light from the lamps 5 and 6 is prevented from being visible through the light aperture 15 when the line of sight is horizontal or approximately horizontal.

The outer screening member 12, which serves to secure accurate determination of the ranging beam distribution in the horizontal direction, is preferably placed at a relatively large distance from the light emitting units, so that a sharp limitation of the ranging beam is obtained. In the embodiment according to the figure, the contours 13 and 14 of the screening member are utilized for limiting the lateral sectors, so that the boundary line of these sectors adjacent the ranging beam will be codirectional with the ranging beam boundary. In order for this result to be achieved, the spacing between the light aperture 15 and the contours 13 and 14 should be approximately equal to the projection onto the screening member of the distance between the mutually remotest parts of adjacent light emitting units.

As was pointed out above, it may be suitable to place the light emitting units 5 and 6 in a different horizontal plane from that of the light emitting unit 4 and the light aperture 15. This provides the advantage that when the line of sight is horizontal or approximately horizontal, i.e. when the beacon is observed from a reasonably substantial distance, as is usual in practice, the light emitting units 5 and 6 or their windows 9 and 10 cannot be visible through the light apperture for the ranging beam.

In the embodiment according to the figure, the three light emitting units are placed relative to the outer screening member with the light aperture 15 in such a way that only the light from the unit 4 can be seen through this light aperture. The light from the two other units 5 and 6 becomes visible only outside the respective contours of the screen. In spite of the comparative narrowness of the light aperture, whose width is determined primarily by the desired angular extent of the ranging beam, it is possible to obtain through this arrangement lateral sectors of larger extent, which is a practical advantage. It is furthermore of importance to be able to provide good beacon characteristics in the form of sharp limits of high light intensity with small error angles by means of a simple screening member without any coloured or uncoloured glass panes. The risk of false light effects is further eliminated owing to the fact that the inner screen in combination with the outer screen prevents not only direct light from the light emitting units but also diffuse or reflected light from frost-coated glass-panes or the like to become visible in other than the desired directions.

What is claimed is:
1. A light beacon for transmitting a narrow and sharply defined ranging beam within a sector bordered by sectors having beams of different characteristics, comprising at least three light sources, said light sources being laterally disposed in a horizontal plane, and a vertical screening member of a width between outer edges thereof approximately equal to the distance in the same plane between the outermost of said light sources, said screening member being disposed forwardly of the light sources and at a distance therefrom, said screening member having an aperture in the center thereof defining the horizontal distribution of the light from an inner one of said light sources constituting the ranging beam, and the outer edges of said screening member defining the boundary of a lateral sector on either side of the ranging beam which emanates from the adjacent outermost of said light sources.

2. A light beacon according to claim 1 wherein the outermost of said light sources are disposed in a different horizontal plane than the center one of said sources but with said aperture of said screening member being positioned in the same horizontal plane as the center one of said light sources.

3. A light beacon for transmitting a narrow and sharply defined ranging beam within a sector bordered by sectors having beams of different characteristics, comprising at least three light sources, said light sources being laterally disposed in a horizontal plane, and a vertical screening member disposed forwardly of the light sources and at a distance therefrom, said screening member having an aperture in the center thereof defining the horizontal distribution of the light from the center one of said light sources constituting the ranging beam, and the outer edges of said screening member defining the boundary of a lateral sector on either side of the ranging beam which emanates from each of the outermost of said light sources, an inner screen disposed between said light sources and said screening member, said inner screen having an aperture in the center thereof for transmitting the ranging beam and of a width no greater than the distance between the outermost of said light sources.

References Cited in the file of this patent

UNITED STATES PATENTS

| | | |
|---|---|---|
| 1,239,672 | Dahl | Sept. 11, 1917 |
| 2,308,085 | Kinney | Jan. 12, 1943 |
| 2,370,823 | Trautner | Mar. 6, 1945 |
| 2,559,415 | Field | July 3, 1951 |

FOREIGN PATENTS

| | | |
|---|---|---|
| 5,863 of 1883 | Great Britain | Dec. 26, 1883 |
| 20,941 | Great Britain | Sept. 11, 1897 |
| 560,974 | Great Britain | Apr. 28, 1944 |
| 159,104 | Sweden | June 4, 1957 |